US006698811B1

(12) United States Patent
Schuchman

(10) Patent No.: US 6,698,811 B1
(45) Date of Patent: Mar. 2, 2004

(54) WHEELED ATTACHMENT FOR PATIENT TRANSPORT LITTER

(76) Inventor: William J. Schuchman, 10733 Big Bend Blvd., St. Louis, MO (US) 63122

( * ) Notice: Subject to any disclaimer, the term of this patent is extended or adjusted under 35 U.S.C. 154(b) by 0 days.

(21) Appl. No.: 10/410,771

(22) Filed: Apr. 10, 2003

Related U.S. Application Data

(60) Provisional application No. 60/424,819, filed on Nov. 12, 2002.

(51) Int. Cl.[7] .................. B62H 3/02

(52) U.S. Cl. .................. 296/20; 280/47.24; 280/23.1

(58) Field of Search .................. 296/20; 280/47.2, 280/47.24, 23.1

(56) References Cited

U.S. PATENT DOCUMENTS 57,013 A * 8/1866 Tompkins .................. 296/20
704,426 A * 7/1902 Allen .................. 296/20
719,059 A * 1/1903 Tabor .................. 296/20
938,496 A * 11/1909 Mestrovich .................. 296/20
1,182,876 A * 5/1916 Lieskovan .................. 296/20
3,580,592 A * 5/1971 Schrecengost .................. 280/8

* cited by examiner

*Primary Examiner*—Joseph D. Pape
(74) *Attorney, Agent, or Firm*—Polster, Lieder, Woodruff & Lucchesi, L.C.

(57) ABSTRACT

An attachment (A) mounted on an end of a litter (L) used for transporting a person includes a frame (3) extending transversely of the litter between poles (P1, P2) at one end of the litter. A pair of collars (4) are attached to the frame and sized to fit over ends of the poles for mounting the attachment to the litter. Wheels (1, 19) carried by the frame extend beneath the litter so when the attachment is mounted in place, the litter is movable over a surface by only one attendant. A trapezoidal support (18) extends upwardly from the frame above an upper surface of the litter so when the attendant lifts the end of the litter opposite that on which the attachment is mounted, the person placed on the litter is supported in place and will not fall off the litter.

21 Claims, 10 Drawing Sheets

WHEELED ATTACHMENT FOR PATIENT TRANSPORT LITTER

CROSS REFERENCE TO RELATED APPLICATIONS

Provisional patent application No. 60/424,819 filed Nov. 12, 2002.

STATEMENT REGARDING FEDERALLY SPONSORED RESEARCH OR DEVELOPMENT

N/A

BACKGROUND OF THE INVENTION

This invention relates to patient transport such as a litter or stretcher normally carried by two attendants; and, more particularly, to a wheeled attachment readily connected to one end of the litter or stretcher to convert it to a patient transport which improves the mobility of a conventional man litter, and reduces the manpower required to move a medical casualty, medical patient, or human remains. By converting a non-wheeled stretcher, litter, gurney, or material transporting conveyance, usually requiring two to four, or more people to use, to an emergency conveyance requiring only one person or two people, the invention has a significant impact on the rapid movement of wounded and injured casualties, or remains from the scene of an accident, cataclysmic event, natural catastrophe, military action, weapons of mass destruction (WMD) event, terrorist act, or the transport of materials.

In the military, for example, a transport device such as a litter typically comprises two elongated poles between which is stretched a material upon which an injured person is placed. Once the patient is loaded onto the litter, at least two people (one at each end of the litter) are required to lift the litter and carry the injured person to a care facility. If the person requires medical treatment during transport, or if the scene is somehow contaminated, more than two people are required to move the person. The litter bearers are often required to transverse uneven terrain to get the injured person to an aid station. In mass casualty situations, where there are often numerous people requiring aid, the number of people required to transport the injured is often insufficient to meet the needs of those requiring assistance. Other situations such as natural catastrophes and cataclysmic events, and civil disobedience also place excessive demands on those providing assistance to the injured.

In some instances, wheeled transport vehicles such as stretchers and gurneys are available. However, their size often makes them impractical to use. In addition, it is well known that standard wheeled stretchers, litters, gurneys other conveyances are sensitive to such wheeled transport impediments as debris, surface disruptions and surface breaks associated with conditions within the area, and to the immediate exterior of impact, emergency, and triage zones. Further, present motorized or non-motorized four wheeled fixed or scissors frame stretchers, litters, gurneys, and other conveyances are not generally present in sufficient numbers for a mass casualty emergency response provider, civil, or military inventory to immediately aid mass casualties. Accordingly, those responding to the situation must rely upon a traditional canvas or nylon collapsible frame type litter to move most of those needing assistance.

As noted above, these non-wheeled appliances require two or more carrying attendants to lift the appliance and transport the victim, casualty or remains to a decontamination area, an area assigned for medical triage or transfer, or for movement of materials to a destination. There are other problems with a non-wheeled stretcher, litter, gurney, or other similar conveyances, such as limited vision. This lack of visibility often causes the rear attendants to trip over hazards resulting from debris and broken surfaces, and presents the potential for additional injury to patients, as well as the attendants. Further, during mass de-contamination and casualty evacuation situations, the effects of weather, stress and the physical fatigue suffered by attendants significantly effects manpower efficiency and the time required for the transport of casualties. As a result, the injured may suffer more than they otherwise need to, or they may not get to medical treatment in time.

In addition to the above described situations, in other settings such as hospitals, nursing homes and care facilities, there is often not sufficient manpower to timely move someone to or from their beds for treatment, or during an emergency evacuation.

BRIEF SUMMARY OF THE INVENTION

The present invention is directed to a self-storing wheeled attachment, which can be quickly and conveniently mounted to one end of a non-wheeled stretcher, litter, gurney, or similar patient transport conveyance, so to convert the conveyance to a wheeled transport system requiring only one person to operate. Installation and use of the attachment relieves the fatigue and exhaustion suffered by attendants by making the transport device easier to maneuver, and by diagonally shifting the load lifting and transport weight to a load-bearing rear axis of the converted wheeled conveyance. By reducing the number of people required to handle each litter or stretcher, the efficiency and speed of transport in situations that may require a minimum amount of time and energy to evacuate people is greatly increased. The attachment also improves the stability and transport of people during individual evacuations. The attachment makes it easier for the person moving the stretcher to avoid debris and other hazards and avoid tripping, falling, and possible injuries to themselves.

The attachment, which is mounted on an end of a litter used for transporting a person, includes a frame extending transversely of the litter between poles at one end of the litter. A pair of collars are attached to the frame and sized to fit over ends of the poles for mounting the attachment to the litter. Wheels carried by the frame extend beneath the litter so when the attachment is mounted in place, the litter is movable over a surface by only one attendant. A trapezoidal support extends upwardly from the frame above an upper surface of the litter so when the attendant lifts the end of the litter opposite that on which the attachment is mounted, the person placed on the litter is supported in place and will not slide downward off the litter.

Other objects will be in part apparent and in part pointed out hereinafter.

BRIEF DESCRIPTION OF THE SEVERAL VIEWS OF THE DRAWINGS

The objects of the invention are achieved as set forth in the illustrative embodiments shown in the drawings, which form a part of the specification.

Corresponding reference characters indicate corresponding parts throughout the several views of the drawings.

DETAILED DESCRIPTION OF INVENTION

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention. As various changes could be made in the above constructions without departing from the scope of the invention, it is intended that all matter contained in the above description or shown in the accompanying drawings shall be interpreted as illustrative and not in a limiting sense.

Figure 1:
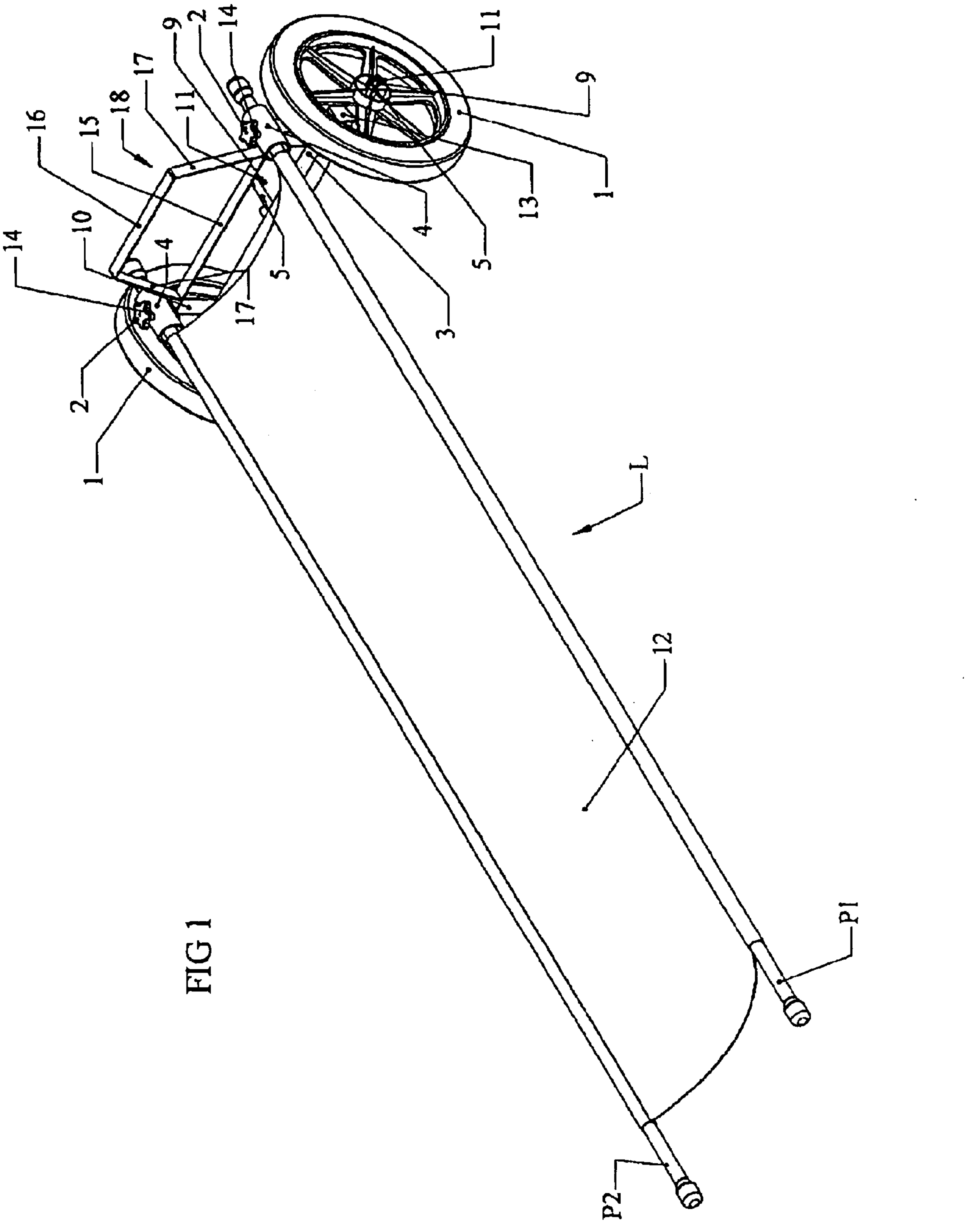
FIG. 1 is a perspective view of a litter or stretcher with an attachment of the present invention mounted on one end of the litter.

Referring to the drawings, an attachment A of the present invention is shown in FIG. 1 to be mounted to a man carrying transport or litter L. The litter is comprised of two elongate poles P1, P2 between which is stretched a web of material 12. As noted above, when a person is placed on the litter, it typically requires two-four people to transport the person from one location to another.

Figure 2:
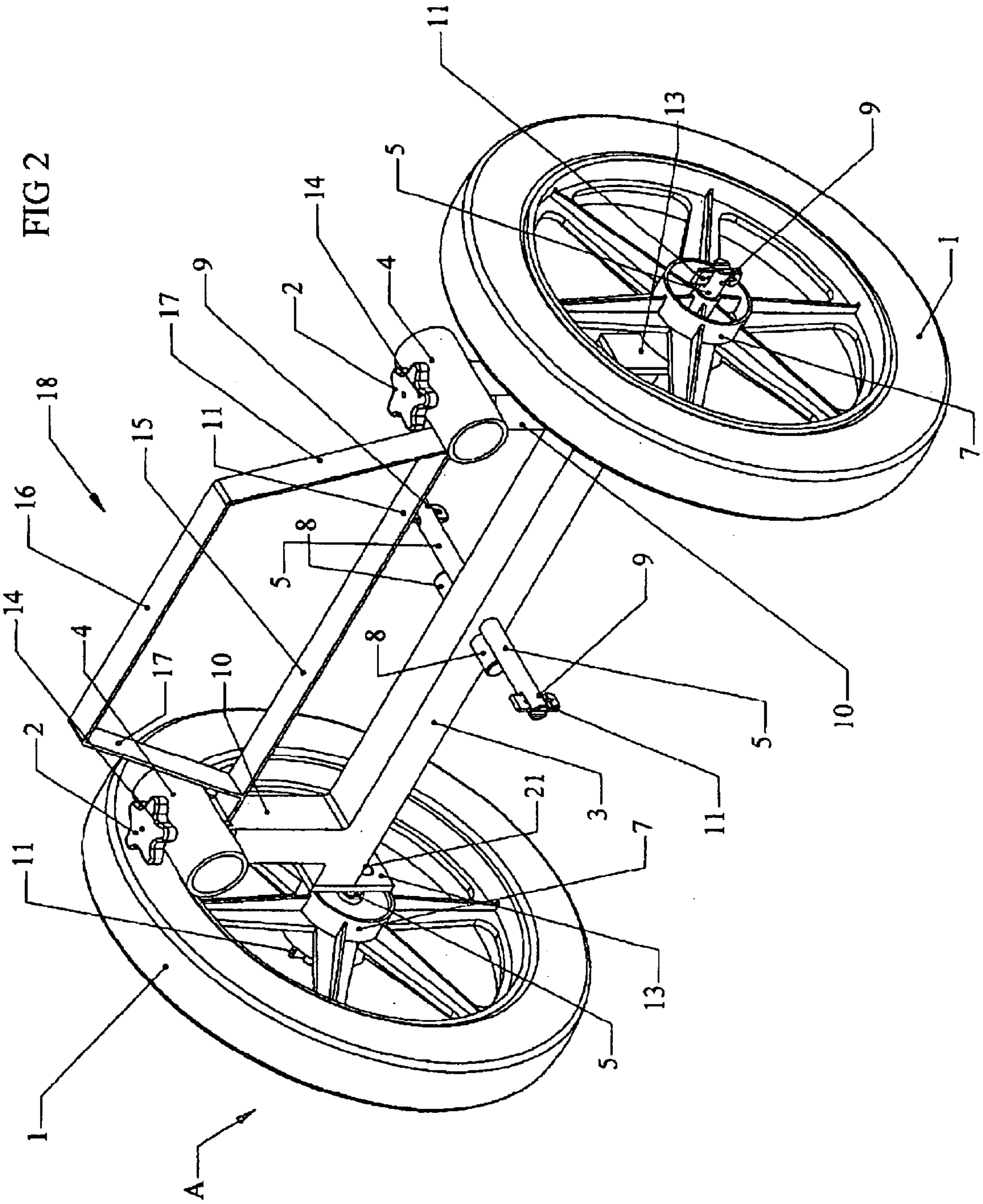
FIG. 2 is a perspective view of the attachment.
Figure 3:
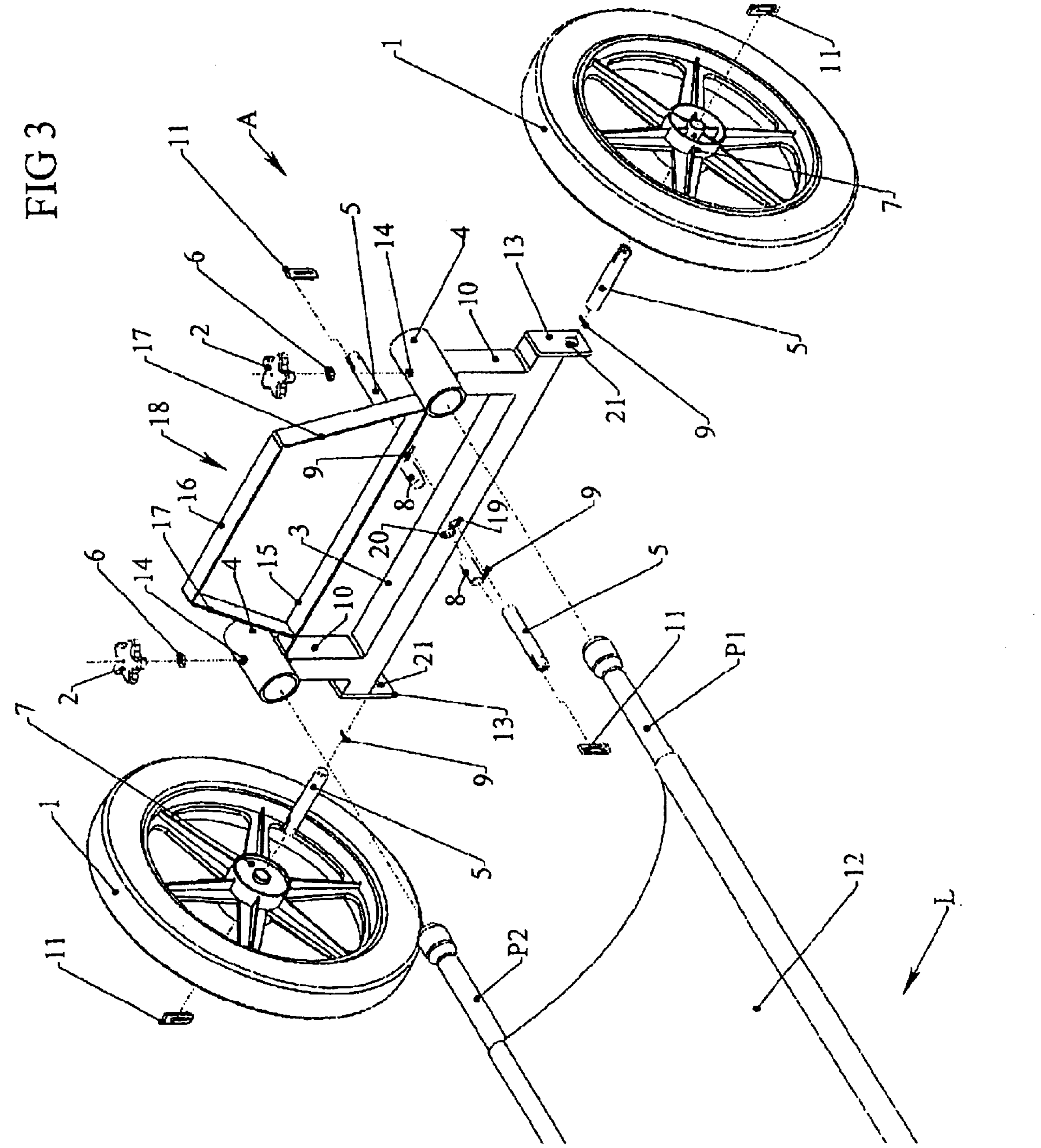
FIG. 3 is an exploded view of the attachment.

Referring to FIGS. 2 and 3, attachment A comprises a main frame 3 which extends transversely of litter L, the length of frame 3 may be slightly greater than the distance between poles P1, P2. At each end of the main frame is a vertically extending bracket plate 13. The bottom end of each plate projects beneath the bottom of frame 3 and a hole 21 is formed in this lower end of each plate. A wheel axle 5 has a diameter corresponding to that of hole 21 for one end of the axle to extend through the hole. The end of the axle 5 inserted through the hole 21 is locked in place in any convenient manner, axle does not rotate—is welded to B.

A slot is formed in the outer, distal end of each axle 5, the slot extending from the outer end of the axle, into the body of the axle a predetermined distance. A wheel 1 is mounted onto each axle. Each wheel has a central hub 7 with an opening therein sized for the hub to be received on an axle 5. When mounted on axle 5, wheel 1 sits inwardly of the inner end of the slot. A lock clip 11 is sized to be received in the slot, after wheel 1 is mounted on axle 5. A bore extends transversely of axle 5, at the outer end of the axle, the bore extending into the slot. A locking pin 9 is sized to fit into and through the bore. In assembling attachment A, a wheel 1 is first mounted on each axle 5. A lock clip 11 is then inserted through the slot in each axle, and locking pin 9 is then inserted through the bore, and clip 11, to lock clip 11 in place and maintain the wheel on the axle 5.

Inwardly of each end of mainframe 3 is a vertical support 10. A tubular collar 4 is atop each vertical support. The collars extend transversely of mainframe 3. The distance between vertical supports 10 and the collars 4 corresponds to the spacing between litter poles P1, P2 when the litter is unfolded for use. The diameters of the collars 4 are larger than those of the support poles for an end of each pole to be conveniently inserted through an appropriate collar to mount attachment A to one end of litter L. A hole (not shown) extends from the top of each collar 4 into the collar and a threaded nut 14 is affixed to the outer face of the collar and the entrance to the opening. A locking bolt 2 is threaded through nut 14 for a distal end of the bolt to bear against a litter pole to lock attachment A in place. An end cap 6 may be fitted into the distal end of the locking bolt to prevent wear on the litter pole where the locking bolt bears against it. As shown in FIGS. 2 and 3, a star shaped handle is provided for a user to conveniently turn the locking bolt. However, those skilled in the art will appreciate that the locking bolt can have other types of handles as well.

Extending between vertical supports 10, at the upper end of the supports and immediately beneath the collars 4 is a transversely extending horizontal frame member 15. A pair of vertical frame members 17 extend upwardly (as shown in FIG. 1) from each end of frame member 15. Both frame members 17 angle inwardly as shown in the drawings. Between the outer ends of frame member 17, a horizontal frame number 16 extends. The frame numbers 15, 16, and 17 together form a trapezoidal support 18 so when a litter bearer lifts end of the litter opposite to that on which attachment A is mounted, a person resting on the litter will not slide off. Rather, support 18 acts, in effect, as a footrest to help keep a person resting on the litter in place while being moved.

The importance of attachment A is that it reduces the manpower required to move an injured person placed on the litter from two-four to one. This manpower reduction can mean that more injured people can be simultaneously transported, if litters with attachment A are available, or that these other people can perform other tasks rather than transporting the injured. Attachment A is designed for easy assembly and disassembly so that it is easy to store whether in the field, a hospital, or a nursing home or the like. In hospitals and nursing homes, attachment A can be conveniently stored in a closet or under a bed for ready access and permits patients to be quickly transported from areas not readily accessible by gurneys or the like. Attachment A also allows such transport devices to negotiate stairs and the acute angles of corridors.

Figure 4:
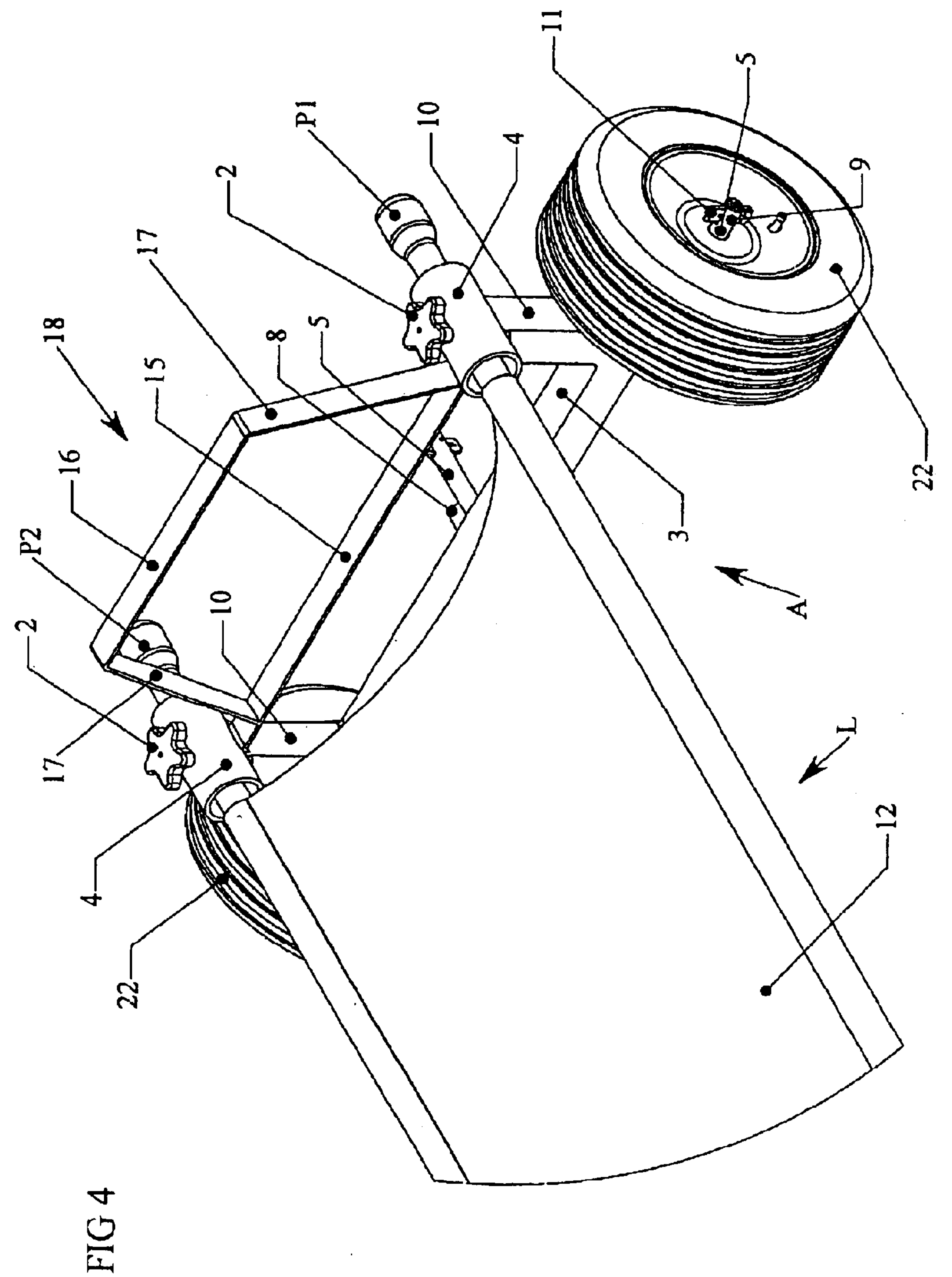
FIG. 4 is a perspective view of the attachment using different size wheels.
Figure 5:
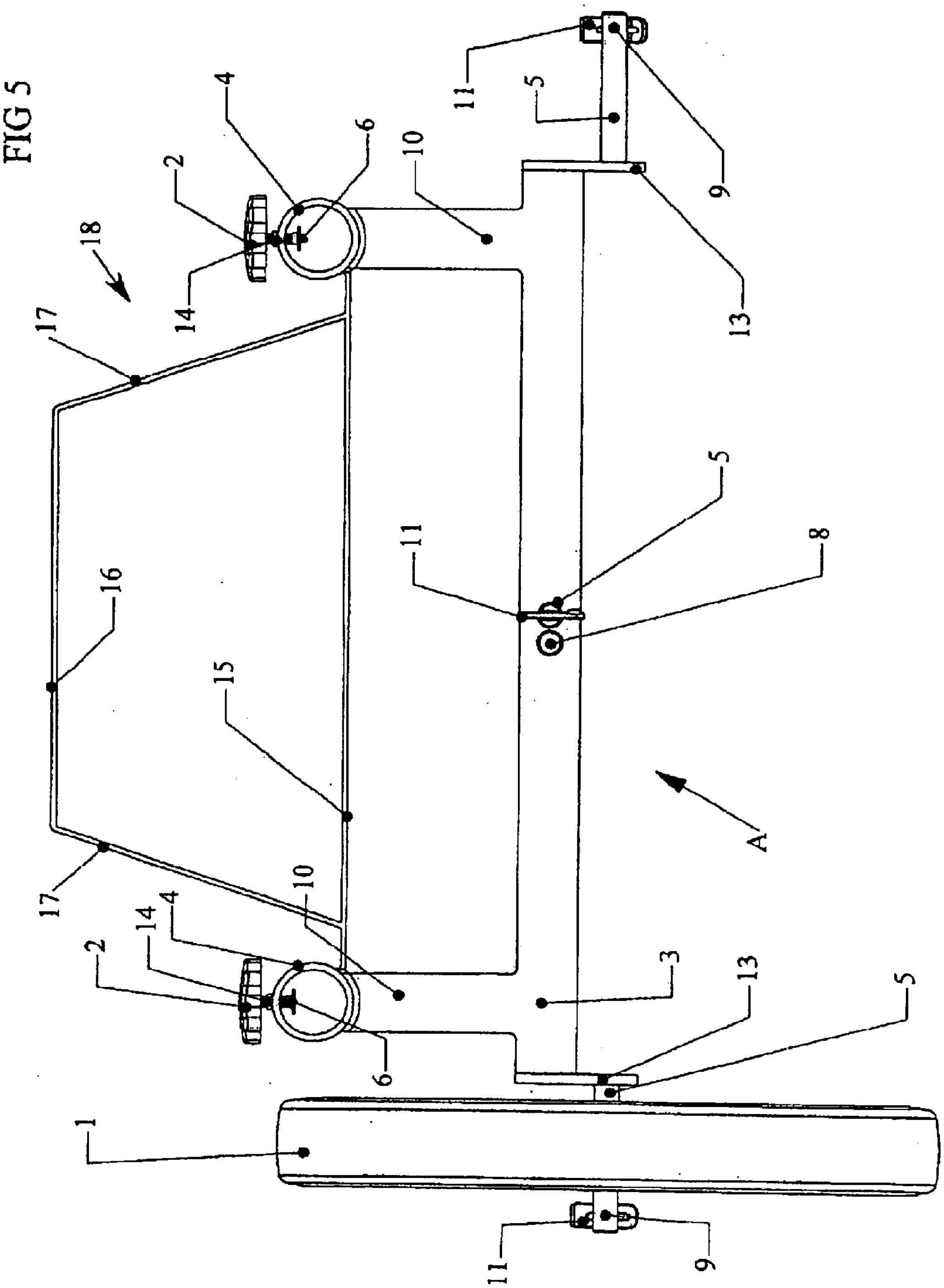
FIG. 5 is an end elevation view of the attachment.
Figure 6:
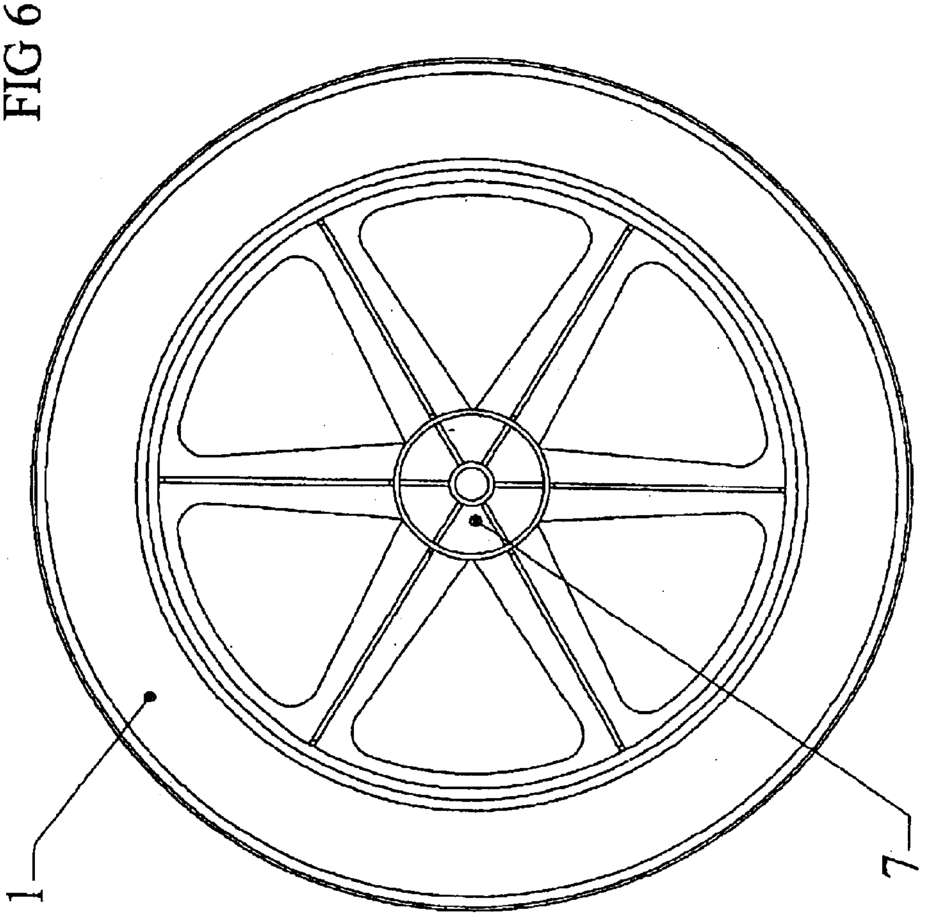
FIG. 6 is an elevation view of a wheel used on the attachment.
Figure 7A:
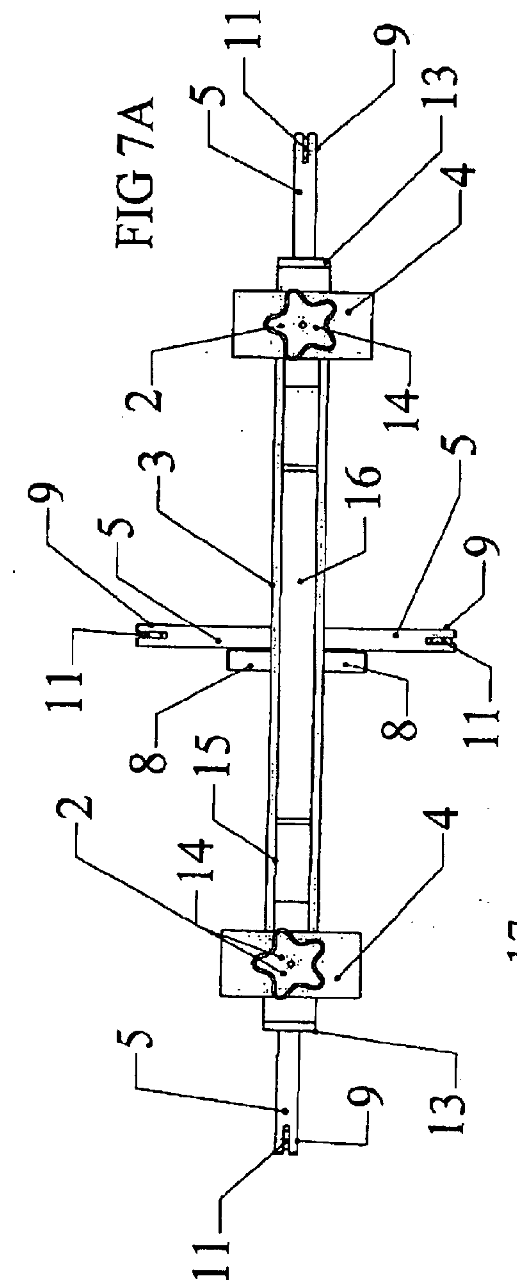
FIGS. 7A and 7B are respective top plan and end elevation views of the attachment.
Figure 7B:
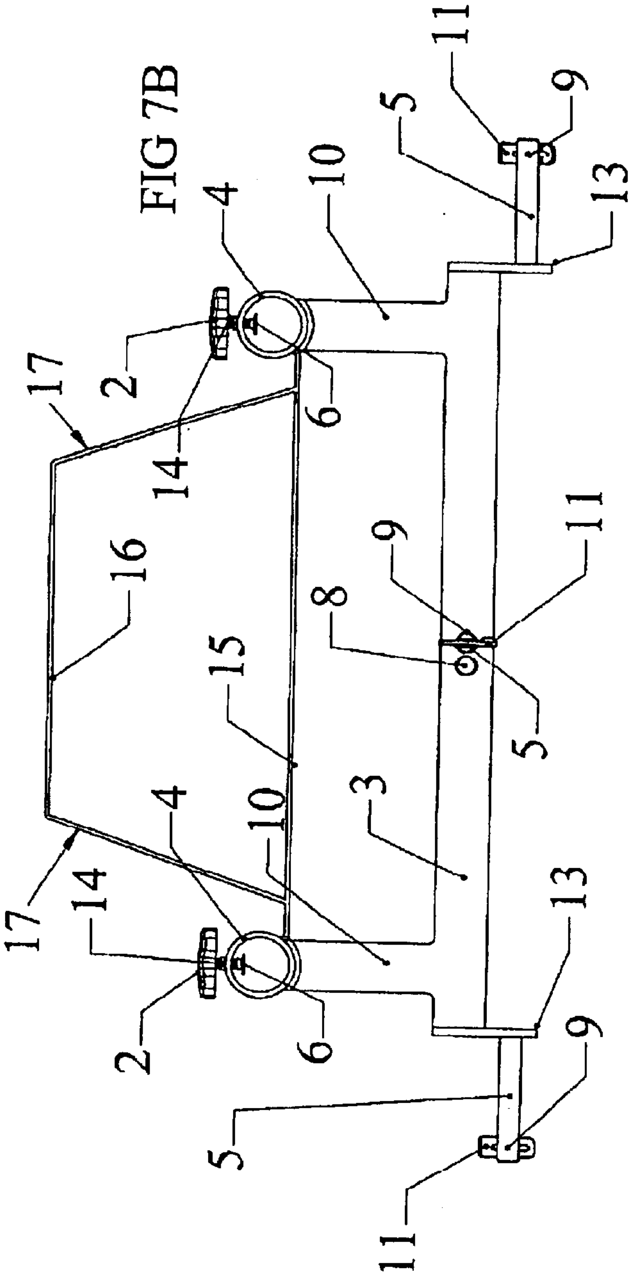
Figure 8:
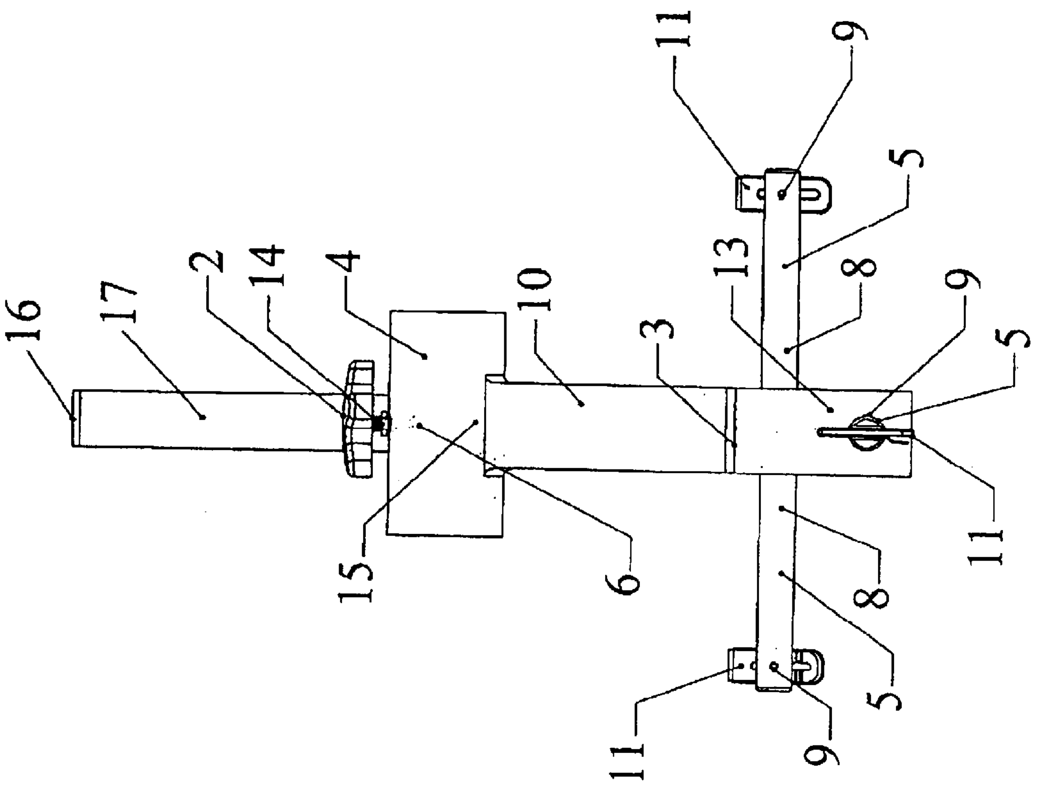
FIG. 8 is a side elevation view of the attachment.

In the field, attachment A allows one person to move a litter over level terrain as well as over uneven or broken ground. The litter bearer can readily move the litter uphill or downhill and their sightlines are such that they can see obstacles they might not be able to see if part of a two or four man litter transport. This will keep them from tripping and falling. The wheels 1 used with attachment A can be narrow tread, solid wheels made of rubber or a rugged plastic material. In certain circumstances, the wheels 1 can be replaced with wider tread tires 22 such as shown in FIG. 4.

Litter L and attachment A may sometimes be stored in a narrow, tight fitting space. As shown in FIGS. 2 and 3, side-by-side holes 19 and 20 are formed in mainframe 3. Axle's 5 identical to those previously described are mounted as shown in FIG. 2 in the hole 19 so to extend orthogonally of litter L. Wheels 1 are mounted on each axle using lock clips 11 and locking pins 9 again as previously described. In the hole 20 adjacent hole 19, anti-rotating wheel studs 8 are mounted. The studs prevent the litter from turning or rotating when stored or transported.

Figure 9:
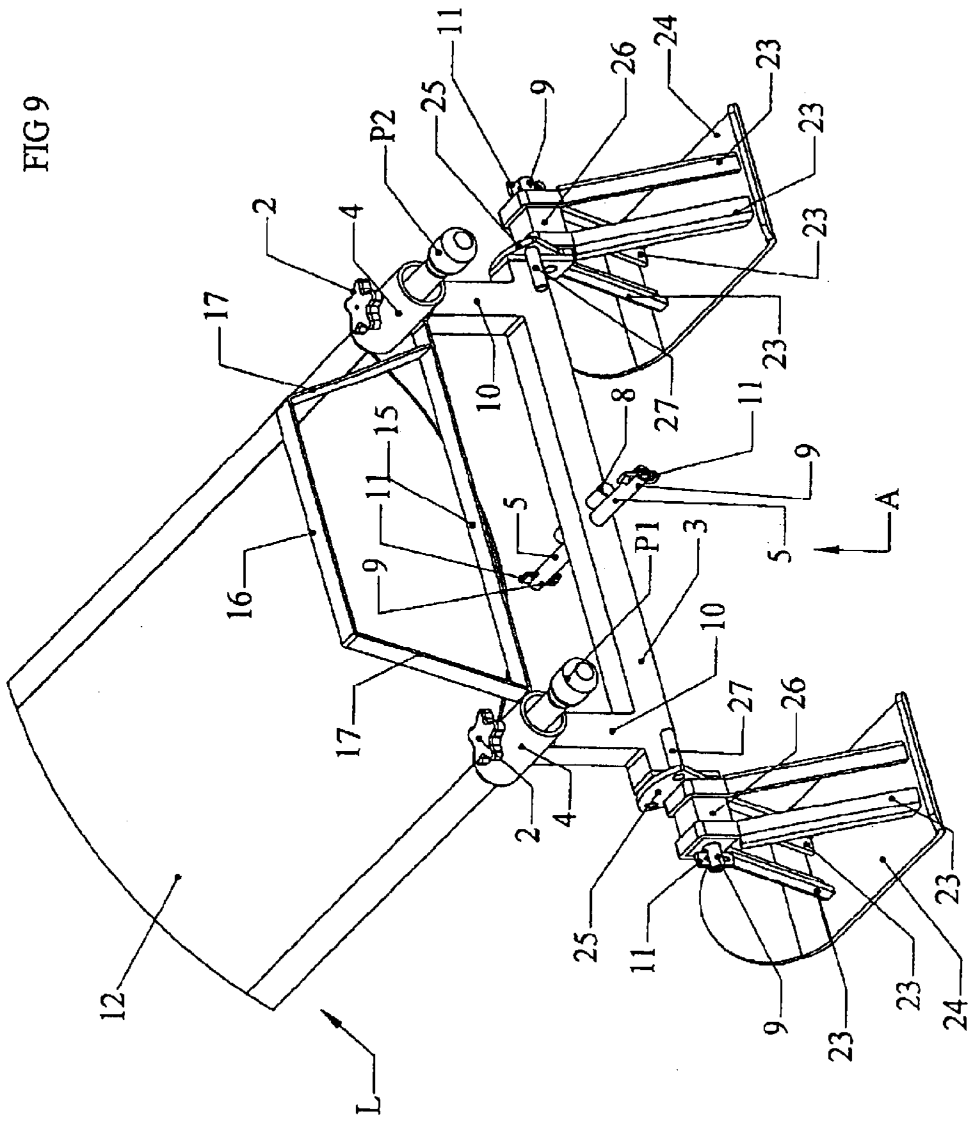
FIG. 9 is a perspective view of another embodiment of the attachment using skis instead of wheels; and, FIG. 10 is a view similar to FIG. 2 and illustrating a motorized version of the attachment.

In addition to attachment A enabling litter L to be readily movable over the ground, as shown in FIG. 9, an attachment A of the invention allows the litter to be readily movable by a single person over soft terrain such as sand as well. In this embodiment a pair of skis 24 are mounted to mainframe member 3. Each ski 24 has four angled struts 23 which attach to a mounting bracket 26 that is mounted onto plate 25 using axle 5, lock clip 11, and locking pin 9 as previously described. Mounting bracket 26 has an upstanding plate 25 at its inner end. A pair of stops 27 extend inwardly of plate 25, on opposite sides of mainframe member 3. The range of motion of skis 24 is limited by the distances the stops 27 can move without striking the front or rear face of the main frame member.

Attachment A can be made of a lightweight metal or plastic. If made of metal the various frame members and the collars are joined together, for example, by welding. If made of plastic, the frame can be molded as a single piece construction. The attachment can be made in different widths for different size litters, or the frame can be formed of two interfitting pieces, which telescope together and apart to accommodate litters of different sizes.

While attachment A is for use in transporting people, those skilled in the art will appreciate that supplies could also be carried on a litter with attachment mounted in place. Thus, in a mass casualty situation, for example, a casualty can be readily transported from an aid station to a field hospital in one direction, with medical supplies then being transported back to the aid station on the litter on the return trip.

Figure 10:
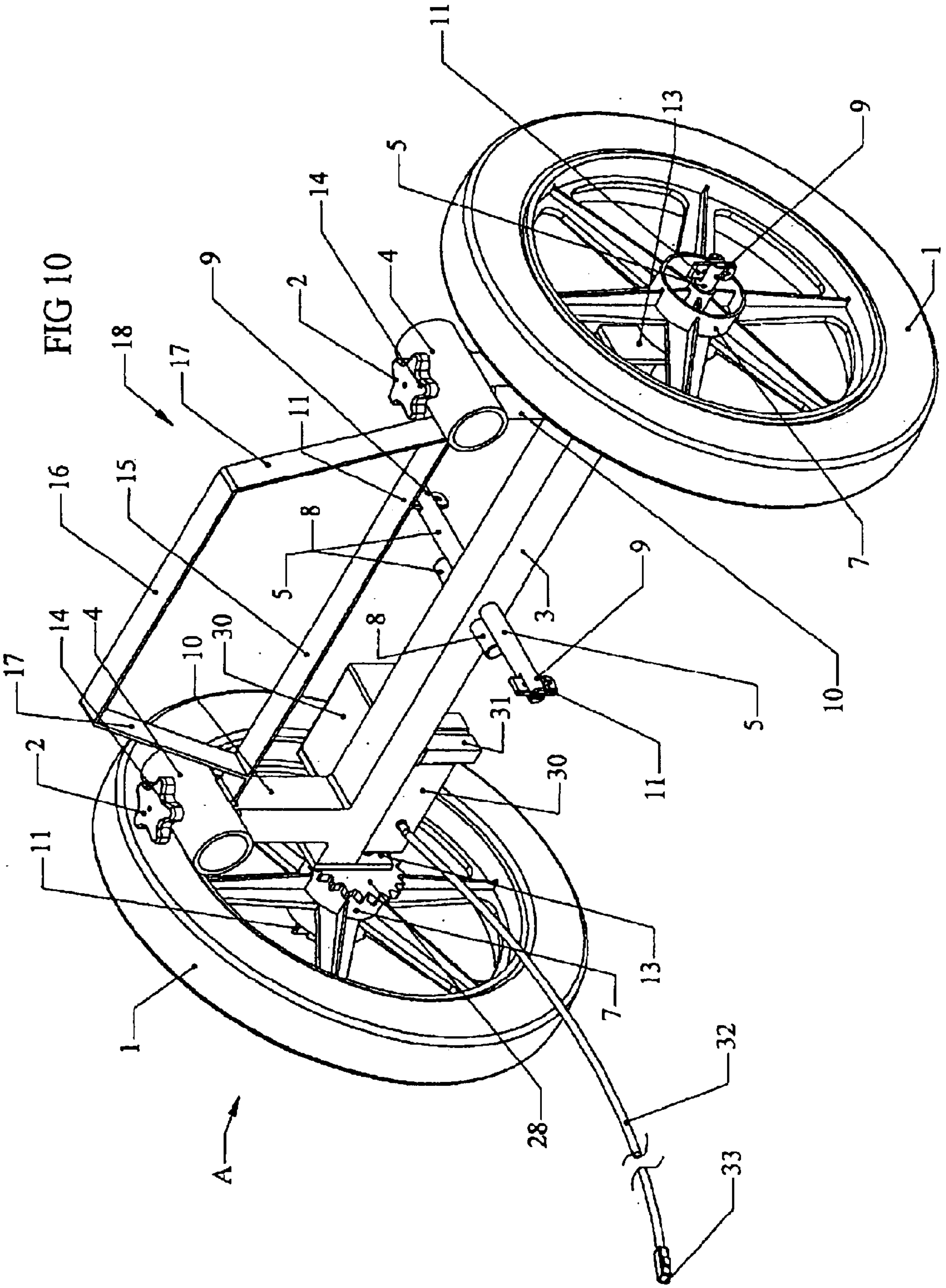

Finally, as shown in FIG. 10, attachment A can also be motorized. In this embodiment, a motor 30 is mounted on frame 3. The motor is, for example, a reversible DC motor having rechargeable batteries 31 also mounted to frame 3. The motor is connected to at least one of the wheels 1, either directly or through axle 5. A control line 32 runs between the motor and a switch 33, which connects, to the other end of pole P1, P2, so the person using the litter can operate the motor to go forward and backup as appropriate.

In view of the above, it will be seen that the several objects and advantages of the present invention have been achieved and other advantageous results have been obtained.

Having thus described the invention, what is claimed and desired to be secured by Letters Patent is:

1. An attachment (A) mounted on an end of a litter (L) for transporting a person from one location to another, the litter including a pair of elongate handles (P1, P2) spaced apart from, and extending substantially parallel to each other, with a web (12) of material extending between and attached to the handles and on which the person is placed for transport, the attachment comprising:

- a frame (3) extending transversely of the litter between the handles at one end of the litter;
- a pair of collars (4) carried on the frame and sized to respectively fit over each of the handles for mounting the attachment to the one end of the litter;
- a pair of wheels (1, 19) carried by the frame and extending beneath the one end of the litter so when the attachment is mounted in place, the litter is movable over a surface by only one attendant; and,
- a support (18) extending upwardly from the frame so when the attendant lifts an end of the litter opposite the end on which the attachment is mounted, the person placed on the litter is supported by the support and will not fall off the litter.

2. The attachment of claim 1 wherein the support comprises a generally trapezoidal support for the person.

3. The attachment of claim 2 in which the support comprises a first horizontal member (15) extending parallel to the frame and outwardly there from, a second and shorter horizontal member (16) also extending parallel to the frame, and to angled support members (17) connecting the two horizontal support members together.

4. The attachment of claim 1 further including a plate (13) at each end of the frame for mounting the wheels to the frame.

5. The attachment of claim 4 further including an axle (5) rotatably supported by each plate.

6. The attachment of claim 5 wherein each wheel includes a hub (7) mounted on each axle, and means for removably mounting a wheel on an axle.

7. The attachment of claim 6 wherein a slot is formed in the outer end of each axle and a lock clip (11) received in the slot after the wheel is installed thereon, and a removable locking pin holding the lock clip in place to keep the wheel mounted on the axle.

8. The attachment of claim 7 further including a second set of axles (5) attached to the frame and extending transversely thereof for mounting wheels to the attachment for storing the litter with the attachment.

9. The attachment of claim 1 further including means for securing the handles to the collars.

10. The attachment of claim 9 wherein the means for securing includes a bolt threaded into an opening in the collar for an end of the bolt to bear against a handle and secure the attachment to the litter.

11. The attachment of claim 4 further including a pair of skis (22) carried by the frame in place of the wheels.

12. The attachment of claim 11 further including a bracket (24) to which each ski is attached, each bracket being attached to one of the plates on the frame.

13. The attachment of claim 12 further including means limiting movement of the skis.

14. The attachment of claim 13 wherein the means limiting movement includes a pair of stops (26) connected to the bracket with one of the stops extending in front of the frame and the other stop extending behind the frame, movement of a ski being limited by the movement of a stop before it contacts a face of the frame.

15. The attachment of claim 1 in which the frame and collars are of a molded, plastic material or a lightweight metal construction.

16. The attachment of claim 1 in which the frame and support of are of a two-piece interfitting construction for the size of the attachment to be adjustable to accommodate different size litters.

17. The attachment of claim 1 further including a motor (30) mounted on the frame for driving at least on of the wheels, and a switch (33) for a user of the litter to operate the motor.

18. An attachment (A) mounted on an end of a litter (L) for transporting a person from one location to another, the litter including a pair of elongate handles (P1, P2) spaced apart from, and extending substantially parallel to each other, with a web (12) of material extending between and attached to the handles and on which the person is placed for transport, the attachment comprising:

- a frame (3) extending transversely of the litter between the handles at one end of the litter;
- a pair of collars (4) carried on the frame and sized to respectively fit over each of the handles for mounting the attachment to the one end of the litter; and,
- a pair of skis (22) carried by the frame and extending beneath the one end of the litter so when the attachment is mounted in place, the litter is movable over soft terrain by only one attendant.

19. The attachment of claim 18 further including a support (16, 17, 18) extending upwardly from the frame so when the attendant lifts an end of the litter opposite the end on which the attachment is mounted, the person placed on the litter is supported by the support and will not fall off the litter.

20. The attachment of claim 19 further including a bracket (24) to which each ski is attached, each bracket being attached to a plate (13) at each end of the frame, and a pair of stops (26) connected to the bracket with one of the stops extending in front of the frame and the other stop extending behind the frame, movement of a ski being limited by the movement of a stop before it contacts a face of the frame.

21. The attachment of claim 19 in which the support comprises a first horizontal member (16) extending parallel to the frame and outwardly there from, a second and shorter horizontal member (18) also extending parallel to the frame, and to angled support members (17) connecting the two horizontal support members together.

* * * * *